United States Patent [19]

Moriarty

[11] Patent Number: 5,309,637

[45] Date of Patent: May 10, 1994

[54] METHOD OF MANUFACTURING A MICRO-PASSAGE PLATE FIN HEAT EXCHANGER

[75] Inventor: Michael P. Moriarty, Simi Valley, Calif.

[73] Assignee: Rockwell International Corporation, Seal Beach, Calif.

[21] Appl. No.: 959,586

[22] Filed: Oct. 13, 1992

[51] Int. Cl.$^5$ .............................................. B23P 15/00
[52] U.S. Cl. ........................... 29/890.054; 29/890.03; 29/890.045; 228/183
[58] Field of Search ............... 29/890.054, 890.045, 29/890.043, 890.03; 228/183; 165/165, 166

[56] References Cited

U.S. PATENT DOCUMENTS

| | | | |
|---|---|---|---|
| 2,268,369 | 12/1941 | Askin | 29/890.054 |
| 2,415,865 | 2/1947 | Booth | 29/890.054 |
| 3,044,160 | 7/1962 | Jaffee | 29/890.054 |
| 3,749,161 | 7/1973 | Hibbeler | 29/890.043 |
| 4,149,591 | 4/1979 | Albertson | 165/165 |
| 4,461,344 | 7/1984 | Allen et al. | 165/165 |
| 4,807,342 | 2/1989 | Lapeyre | 165/165 |
| 4,809,774 | 3/1989 | Hagenmuster | 165/163 |

FOREIGN PATENT DOCUMENTS 1055572  11/1983  U.S.S.R. ................ 29/890.054

Primary Examiner—Irene Cuda
Attorney, Agent, or Firm—H. Fredrick Hamann; Harry B. Field; David C. Faulkner

[57] ABSTRACT

A method of manufacturing a micro-passage heat exchanger includes preparing a substrate of multiple square tubes, configuring multiple layers of the square tubes in a vertical plane, interposing between each layer a braze alloy to form a core, bonding the multiple layers of multiple tubes to form a core mass, forming in alternate tube layers counter flow fluid channels, providing the core mass with sides and manifolds, and brazing the heat exchanger.

1 Claim, 4 Drawing Sheets

METHOD OF MANUFACTURING A MICRO-PASSAGE PLATE FIN HEAT EXCHANGER

FIELD OF THE INVENTION

This invention relates to a method of producing an article of manufacture such as a heat exchanger for use in engine combustors, heat sinks and the like.

BACKGROUND OF THE INVENTION

The production of compact heat exchangers using very small flow passages has yielded highly variable results due to the fact that conventional fabrication methods cannot be controlled sufficiently well to yield consistent flow passage dimensions. Compact gas-gas heat exchangers are usually of the plate-fin type and are fabricated from thin sheets of material or plates to which are bonded, such as by furnace brazing, thin fins which are fabricated from strips of the same material used for the plates. The strips and a sheet of braze foil are tack welded together prior to firing the assembly in a braze furnace. The tack welding of the many hundreds of fins is usually done by hand. Manifolds are usually welded to pre-inserted weld stubs which are included with the braze assembly. When the assembly of very small flow passage heat exchangers is attempted, distortion of the thin sheet-metal fins, weld splatter, and braze drop through form significant and uncontrollable flow path obstructions.

Structural improvements in such heat exchangers are desired to enhance the ease of manufacture and reduce complexity while maintaining or improving durability and reliability. Design flexibility is also important to allow selection of the number of passages, etc. with minimal change in the structure and the manufacturing process.

SUMMARY OF THE INVENTION

It is therefore an object of the invention to provide an improved heat exchanger structure which is easy to fabricate.

It is another object of the present invention to provide an improved method of manufacture of a heat exchanger.

The present invention avoids the problems associated with the conventional plate-fin construction by providing a pre-machined micro-passage flow path in the form of a square tube. Opportunities for weld splatter, braze drop through and part distortion are restricted to the ends of the assembly which are finished by a final machining operation. The final flow passage is formed by laser, water jet, electrical discharge, or conventional machining and will result in consistent and controllable flow passage dimensions. With this configuration, a heat exchanger having a plurality of parallel tubes for carrying a working fluid and a header and tank assembly at each end of the tubes for directing the working fluid through the tubes in a desired flow path is realized.

The invention is further demonstrated by the method of manufacturing a heat exchanger having a pair of headers and manifolds connected by a plurality of parallel square tubes comprising the steps of: (1) preparing a substrate layer of multiple square metal tubes arranged adjacent and physically attached to each other in a horizontal plane; (2) configuring multiple layers in a vertical plane of multiple square metal tubes arranged adjacent to each other and said substrate layer in a horizontal plane and having interposed between each layer of multiple metal tubes physically and communicating therewith a braze alloy thus forming a heat exchanger core; (3) causing the braze alloy within the core to bond the multiple layers of multiple square metal tubes forming a core mass comprising in a vertical plane, multiple layers of multiple square metal tubes arranged adjacent and physically attached to each other and said substrate layer; (4) forming in alternate tube layers counter-flow fluid channels communicating across the entire horizontal plane thereof; (5) providing the core mass with headers, or side containment shells and manifolds in communication with said multiple square metal tube core mass and said counter-flow channels, and (6) brazing the whole assembly or parts of the heat exchanger to bond same together.

BRIEF DESCRIPTION OF THE DRAWINGS

The above and other advantages of the invention will become more apparent from the following description taken in conjunction with the accompanying drawings wherein like references refer to like parts and wherein;.

DESCRIPTION OF THE PREFERRED EMBODIMENT

Although the description that follows is directed to a heat exchanger which might be used in an engine combustor, it will be understood by those skilled in the art that the invention clearly applies to other heat exchangers as well.

Figure 1:
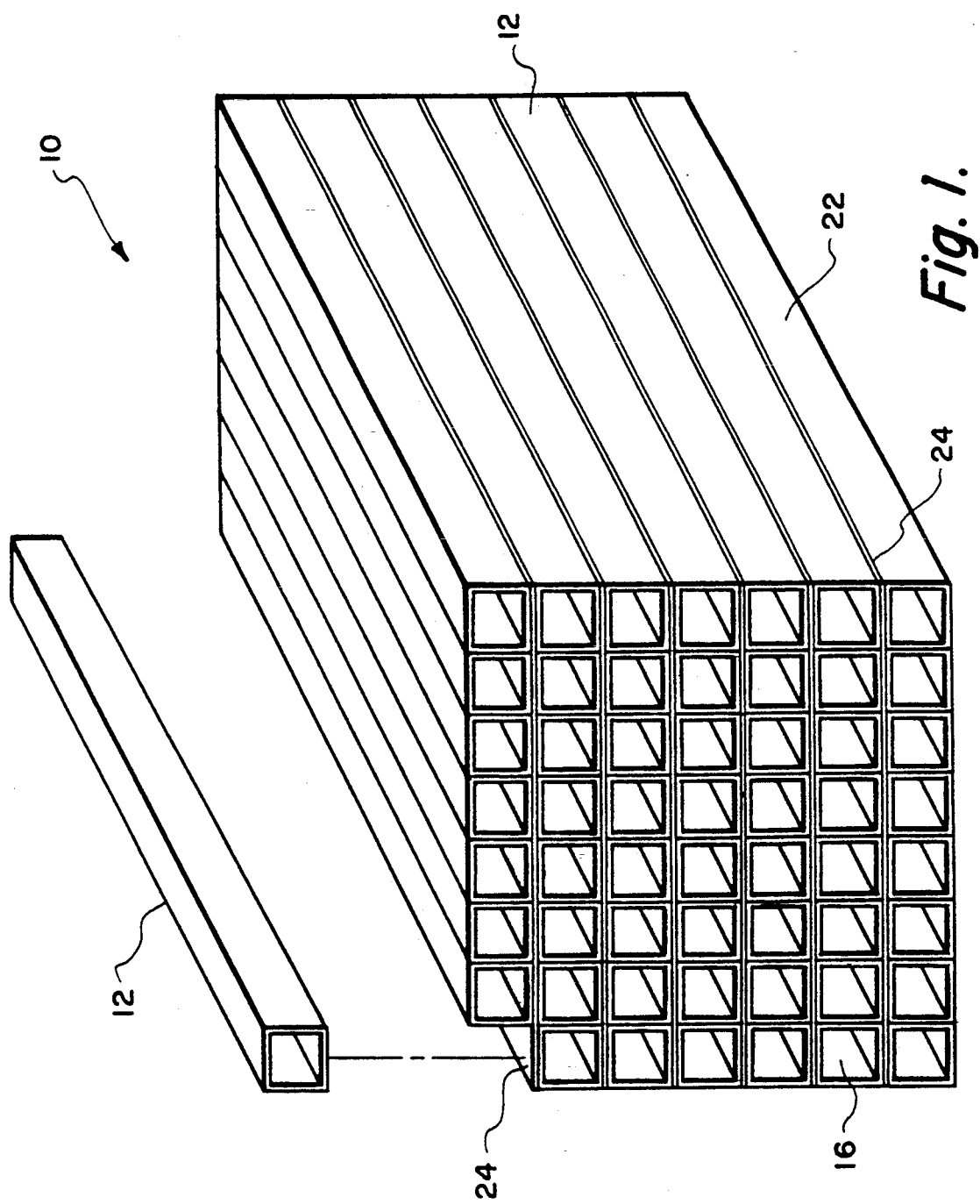
FIG. 1 is a front view of a heat exchanger square tube bundle core, according to the invention.

Referring to FIG. 1, a heat exchanger core assembly 10 of square-formed seamless tubing comprising multiple square tubes 12 having, in a preferred embodiment, a shape of 0.065 inch by 0.065 inch by 0.006 inch and made of stainless steel is depicted. These square-formed seamless tubes 12 are arranged in parallel configuration to form a core assembly 10 as shown in the figures. In preparing the core, the individual square tubes, which might be made of type 304 stainless steel, are assembled by brazing using, for example, a high temperature braze alloy (90/10 Ag/Pd).

Figure 2:
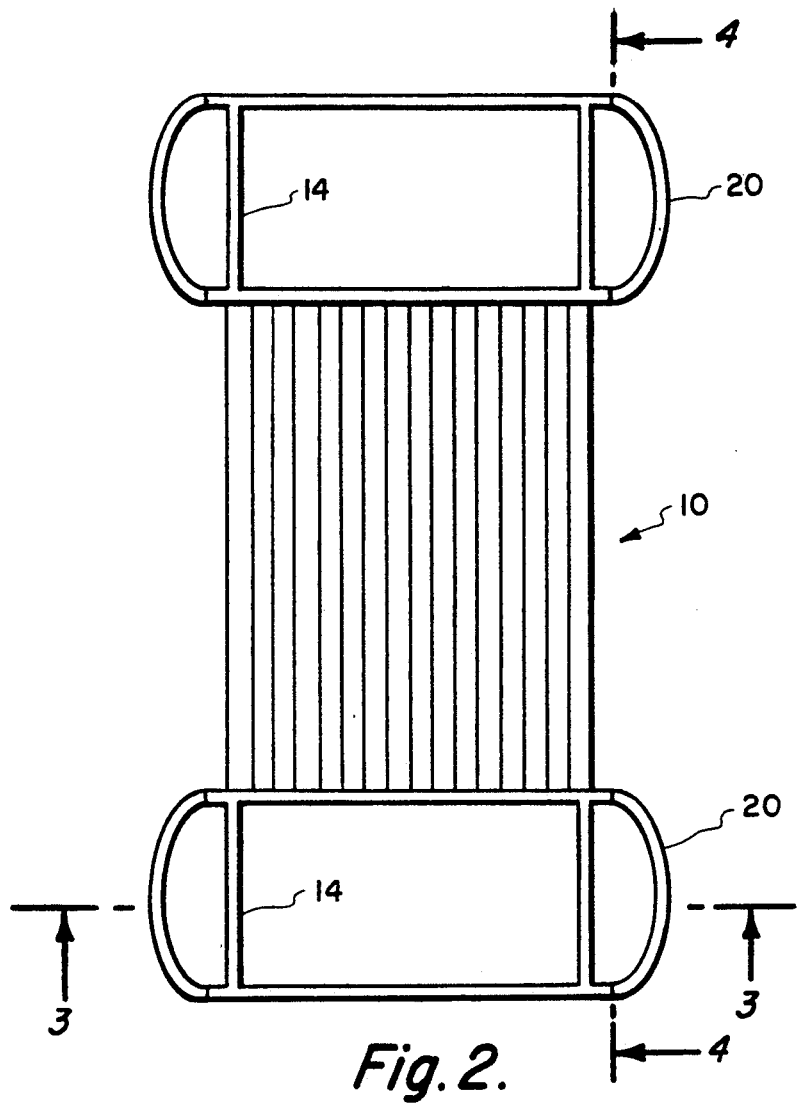
FIG. 2 is a partial top view of a heat exchanger including header assemblies.
Figure 3:
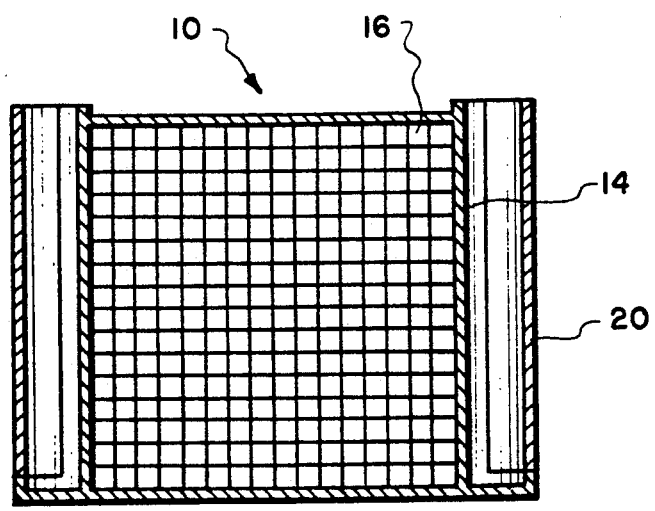
FIG. 3 is a end view of the heat exchanger taken along line 3—3 of FIG. 2.
Figure 4:
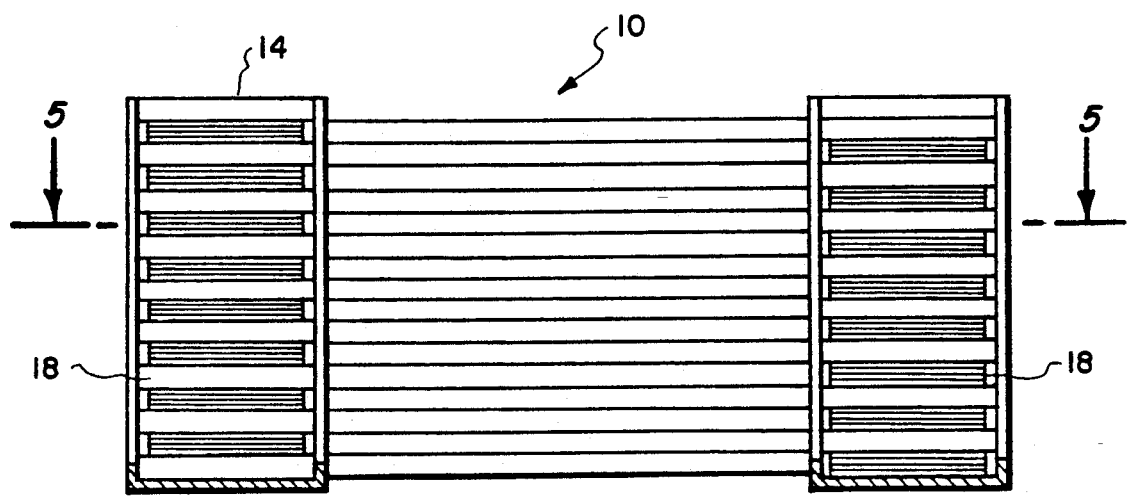
FIG. 4 is a side view of the heat exchanger taken along line 4—4 of FIG. 2 illustrating the counter-flow channels within the heat exchanger core.
Figure 5:
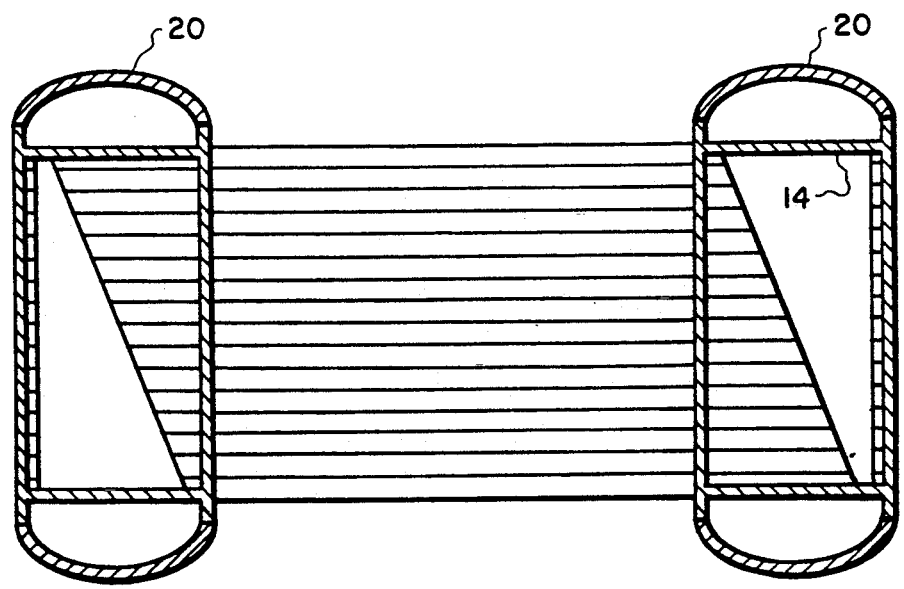
FIG. 5 is a top partial view of the heat exchanger taken along line 5—5 of FIG. 4.

As seen in FIGS. 2 and 3, the heat exchanger core assembly 10 is provided with headers or side containment shells 14. As shown in FIG. 5, each header 14 positioned at opposing ends of the core assembly is configured to function not only with the individual square tube channels 16, but cooperatively also with the alternating counter flow channels 18 (see FIG. 4) cut parallel to the horizontal plane of the core assembly. Engaging the headers are manifolds 20 see FIGS. 2, 5 and 6) which communicate with a cooling fluid source (not shown). which supplies circulating cooling fluid to the heat exchanger as depicted by the arrows in FIG. 6.

Conventional stainless steel heat exchanger materials are employed so that conventional brazing can be used. All the parts comprise a base material of type 304 stainless steel with which a silver base alloy is utilized for brazing of the parts of the heat exchanger.

The manufacture of the heat exchanger comprises preparing a substrate layer 22 (see FIG. 1) of multiple square metal tubes 12 arranged adjacent and physically attached to each other in a horizontal plane. Onto this substrate layer 22 are added seriatim multiple layers in a vertical plane of square metal tubes 12 arranged adjacent to each other and the substrate layer of square metal tubes. Interposed between each layer of multiple square metal tubes is a layer of brazing material or alloy 24 such as 90/10 Ag/Pd alloy which is activated to effect a bonding of the individual tubes via furnace brazing or any other acceptable brazing technique. Upon completion of the core formation, the headers and manifolds are attached, such as by brazing, to the core assembly to form a micro-passage heat exchanger 26 (see FIG. 6).

In operation, the heat exchanger of the present invention functions in the following manner.

Figure 6:
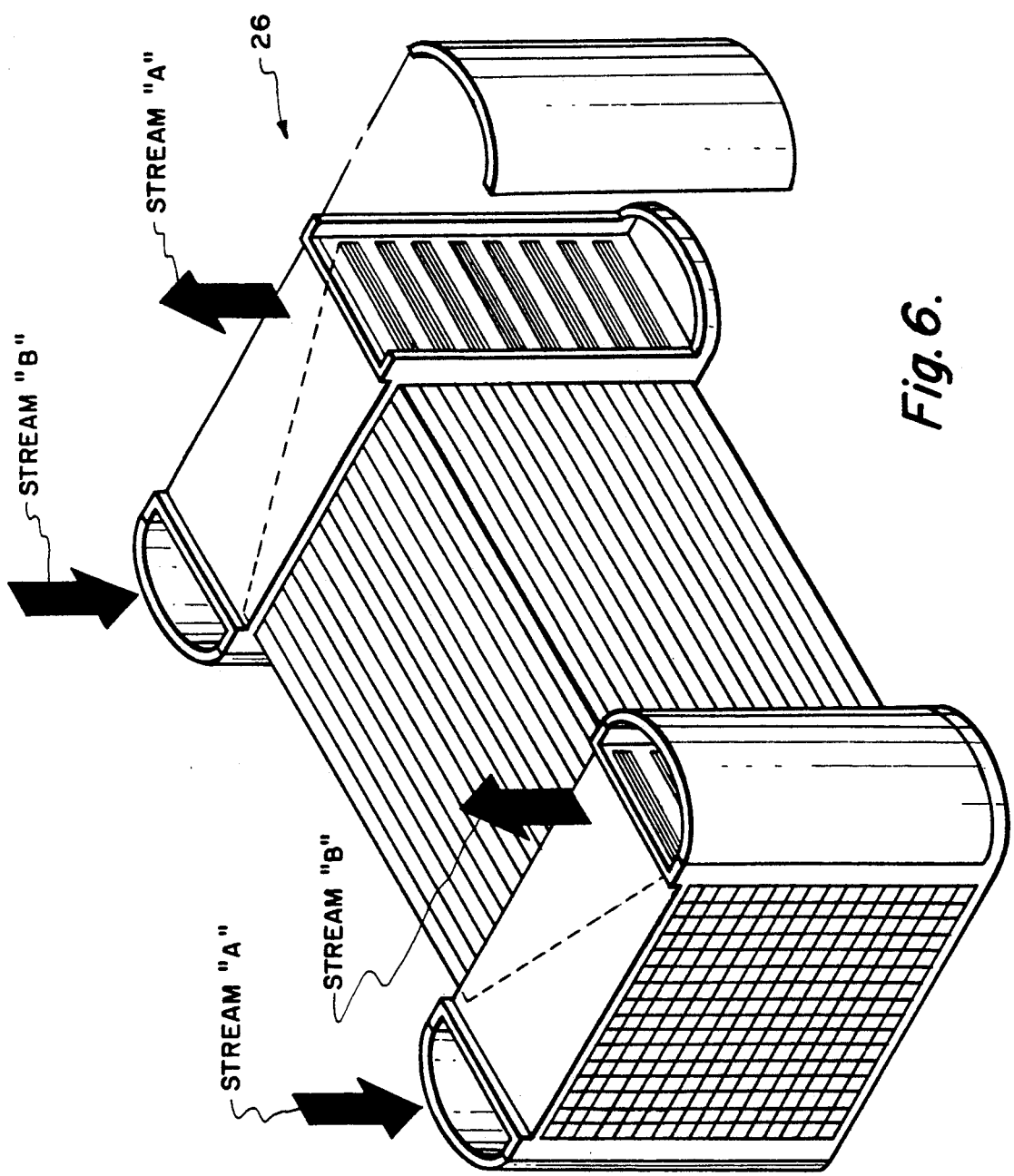
FIG. 6 is a partial exploded view of the heat exchanger of the present invention.

Fluid flow streams of different temperatures are introduced to the assembly as shown by the arrows in FIG. 6. The inlet for stream "A" channels fluid flow into tube layers designated 2′,4′,6′,8′,10′, etc as shown in FIG. 4, formed by tubes 12. The inlet for stream "B" channels fluid flow into the tube layers designated 1′,3′,5′,7′,9′, etc. Once introduced into the assembly 10, the streams flow in counterflow to each other. The hotter stream losses heat to the colder stream, thereby effecting an exchange of heat energy. The amounts of heat gained in the colder stream and lost from the hotter stream are easily computed by conventional heat exchanger analysis methods.

It will thus be seen that according to the invention an improved heat exchanger assembly or structure and the method of making it provide a flexible design having enhanced performance characteristics and is easy to manufacture. Variations from the described embodiment may occur or be evident from the invention and described and claimed herein.

What is claimed:

1. A method of fabricating a heat exchanger comprising the steps of:
   (a) preparing a substrate layer of multiple square metal tubes arranged adjacent and physically attached to each other in a horizontal plane;
   (b) configuring multiple layers in a vertical plane of multiple square metal tubes arranged adjacent to each other and said substrate layer in a horizontal plane as in step (a) and having interposed between each layer of multiple metal tubes physically and communicating therewith a braze alloy thus forming a heat exchanger core;
   (c) causing the braze alloy within the core to bond the multiple layers of multiple square metal tubes forming a core mass comprising in a vertical plane, multiple layers of multiple square metal tubes arranged adjacent and physically attached to each other and said substrate layer;
   (d) forming in alternate tube layers counter-flow fluid channels communicating across the entire horizontal plane thereof;
   (e) providing the core mass with side containment shells and manifolds in communication with said multiple square metal tube core mass and said counter-flow channels; and
   (f) brazing the heat exchanger to bond parts thereof together.

* * * * *